(12) United States Patent
Ooki et al.

(10) Patent No.: US 9,840,141 B2
(45) Date of Patent: Dec. 12, 2017

(54) HYBRID VEHICLE DRIVE DEVICE

(71) Applicant: Nissan Motor Co., Ltd., Yokohama-shi, Kanagawa (JP)

(72) Inventors: Shinjiro Ooki, Isehara (JP); Takayuki Okuda, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 280 days.

(21) Appl. No.: 14/646,746

(22) PCT Filed: Nov. 13, 2013

(86) PCT No.: PCT/JP2013/080682
§ 371 (c)(1),
(2) Date: May 22, 2015

(87) PCT Pub. No.: WO2014/097781
PCT Pub. Date: Jun. 26, 2014

(65) Prior Publication Data
US 2015/0306948 A1    Oct. 29, 2015

(30) Foreign Application Priority Data

Dec. 21, 2012  (JP) ................................. 2012-278932

(51) Int. Cl.
*F16H 37/06* (2006.01)
*F16H 57/02* (2012.01)
(Continued)

(52) U.S. Cl.
CPC ................ *B60K 6/405* (2013.01); *B60K 5/04* (2013.01); *B60K 6/36* (2013.01); *B60K 6/40* (2013.01);
(Continued)

(58) Field of Classification Search
CPC ... B60K 6/48; B60K 2006/4825; F16H 3/089; F16H 59/02
(Continued)

(56) References Cited

U.S. PATENT DOCUMENTS 5,558,595 A * 9/1996 Schmidt ................... B60K 6/48
                                                                    477/3
5,875,691 A * 3/1999 Hata ....................... B60K 6/365
                                                                    475/5
(Continued)

FOREIGN PATENT DOCUMENTS

JP      10-341503 A    12/1998
JP      3584680 B2     8/2004
(Continued)

*Primary Examiner* — Ha D Ho
(74) *Attorney, Agent, or Firm* — Global IP Counselors, LLP

(57) ABSTRACT

A hybrid vehicle drive device includes a transmission coupled to the engine output shaft of an engine, a final reduction gear coupled to the transmission output shaft of the transmission, a drive shaft coupled to the final reduction gear, and a power transmission mechanism that transmits the rotation of an electric motor to the final reduction gear. The hybrid vehicle drive device includes a transaxle case accommodating the transmission, the final reduction gear and the power transmission mechanism and having a mounting surface for mounting the engine and the electric motor. The transaxle case is formed by an engine-side converter housing, a transmission-side transmission case, and a middle wall attached to the converter housing and separating the converter housing from the transmission case, the power transmission mechanism being housed between the converter housing and the middle wall.

3 Claims, 3 Drawing Sheets

(51) Int. Cl.

| | |
|---|---|
| *B60K 6/405* | (2007.10) |
| *B60K 6/40* | (2007.10) |
| *B60K 6/48* | (2007.10) |
| *B60K 6/543* | (2007.10) |
| *B60K 6/36* | (2007.10) |
| *F16H 57/00* | (2012.01) |
| *F16H 57/021* | (2012.01) |
| *B60K 5/04* | (2006.01) |

(52) U.S. Cl.
 CPC ............... *B60K 6/48* (2013.01); *B60K 6/543* (2013.01); *F16H 57/0006* (2013.01); *F16H 57/021* (2013.01); *B60K 2006/4808* (2013.01); *F16H 2057/0012* (2013.01); *F16H 2057/02034* (2013.01); *F16H 2057/02043* (2013.01); *Y02T 10/626* (2013.01); *Y02T 10/6221* (2013.01); *Y10S 903/902* (2013.01)

(58) Field of Classification Search
 USPC .................................. 74/665 A, 665 B, 661
 See application file for complete search history.

(56) References Cited

U.S. PATENT DOCUMENTS 6,155,364 A * 12/2000 Nagano .................. B60K 6/365
 180/65.235
6,332,257 B1 * 12/2001 Reed, Jr. .................. B60K 6/26
 29/401.1

FOREIGN PATENT DOCUMENTS

| JP | 2008-267465 A | 11/2008 |
| JP | 2011-31761 A | 2/2011 |

* cited by examiner

HYBRID VEHICLE DRIVE DEVICE

CROSS-REFERENCE TO RELATED APPLICATIONS

This application is a U.S. National stage application of International Application No. PCT/JP2013/080682, filed Nov. 13, 2013, which claims priority to JP Patent Application No. 2012-278932 filed on Dec. 21, 2012, the contents of each of which are hereby incorporated herein by reference.

BACKGROUND

Field of the Invention

The present invention relates to a hybrid vehicle drive device equipped with an engine and an electric motor.

Background Technology

For example, a hybrid vehicle drive device, such as that disclosed in JP Patent No. 3,584,680, has been known. In this vehicle, a first electric motor 10 is coupled to an output shaft 17a via an electric motor transmission 17. The electric motor transmission 17 is configured from planetary gears, and the first electric motor 10, the output shaft 17a, and the electric motor transmission 17 are arranged in one row in the axial direction.

SUMMARY

The rotational speed in the electric motor transmission 17, especially of the rotary element that is connected with a first electric motor 10, can be a high-speed rotation, and radiated noise is likely generated if the rotary element is carelessly installed in a transaxle case; as a result, there is the risk that the vibration performance cannot be secured.

In light of the problem described above, an object of the present invention is to provide a hybrid vehicle drive device that is able to avoid a deterioration in the vibration performance caused by a power transmission mechanism that transmits the rotation of an electric motor to the drive wheels.

For this purpose, this hybrid vehicle drive device includes a transmission coupled to the engine output shaft of an engine, a final reduction gear coupled to the transmission output shaft of the transmission, a drive shaft coupled to the final reduction gear, and a power transmission mechanism that transmits the rotation of an electric motor to the final reduction gear. The hybrid vehicle drive device includes a transaxle case that accommodates the transmission, the final reduction gear and the power transmission mechanism and that has a mounting surface for mounting the engine and the electric motor. Additionally, the transaxle case is formed from an engine-side converter housing, a transmission-side transmission case, and a middle wall attached to the converter housing, which separates the converter housing from the transmission case, wherein the power transmission mechanism is housed between the converter housing and the middle wall.

In other words, with the power transmission mechanism being housed between the converter housing and the middle wall, the power transmission mechanism is not supported by the transmission case, and it is possible to avoid deterioration in the vibration performance caused by the power transmission mechanism.

BRIEF DESCRIPTION OF DRAWINGS

Referring now to the attached drawings which form a part of this original disclosure.

DETAILED DESCRIPTION OF EMBODIMENTS

First Embodiment

Figure 1:
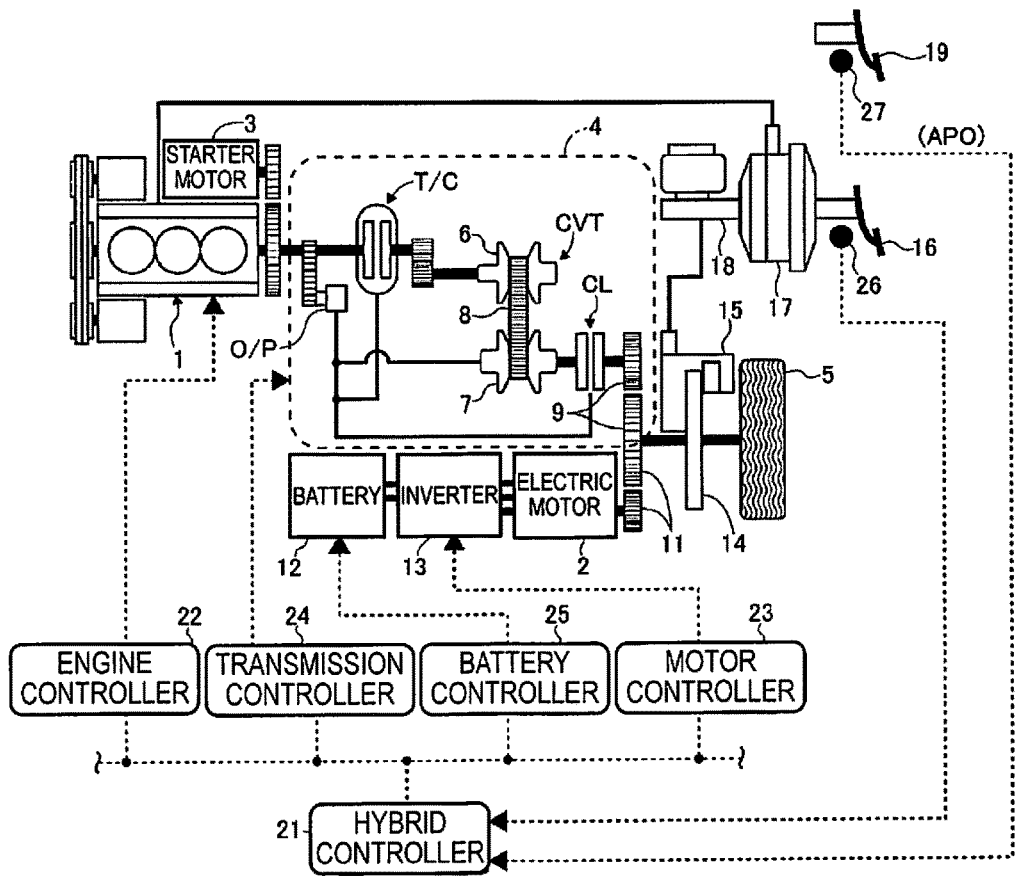
FIG. 1 is a schematic system view illustrating the drive system of the hybrid vehicle drive device and the overall control system thereof of the first embodiment.

FIG. 1 is a schematic system view illustrating the drive system of the hybrid vehicle drive device and the overall control system thereof of the first embodiment. The hybrid vehicle of FIG. 1 is mounted with an engine 1 and an electric motor 2 as the power source, and the engine 1 is started by a starter motor 3. The engine 1 is drivably coupled to drive wheels 5 via a V-belt-type continuously variable transmission 4, which is capable of being appropriately detachable, and the continuously variable transmission 4 is configured so that the outline is as described in the following explanation.

The continuously variable transmission 4 is a continuously variable transmission CVT that is formed from a primary pulley 6, a secondary pulley 7, and a V-belt 8 that is bridged between these pulleys 6, 7. The primary pulley 6 is coupled to a crankshaft, which is an output shaft of the engine 1 via a torque converter T/C with a lockup clutch; the secondary pulley 7 is coupled to the drive wheels 5 sequentially via a clutch CL, a final gear set 9, and a differential mechanism 32 of a final reduction gear device 30 (refer to FIG. 2). Here, the final gear set 9 refers to the meshing between a first gear 9a that is coupled to an output shaft of the clutch CL and a final reduction gear 31 of the final reduction gear device 30.

Thus, in an engaged state of the clutch CL, power from the engine 1 is input to the primary pulley 6 via the torque converter T/C; reaches the drive wheels 5 via the V-belt 8, the secondary pulley 7, the clutch CL, and the final gear set 9 sequentially; and is provided to the traveling hybrid vehicle.

An electric motor 2 is constantly coupled to the drive wheels 5 via a power transmission mechanism 11, and this electric motor 2 is driven via an inverter 13 by power from a battery 12. Here, the power transmission mechanism 11 refers to the meshing among a second gear 11a (a rotary element) that is coupled to an output shaft of the electric motor 2, a third gear 11b that meshes with the second gear 11a, and a final reduction gear 31 that meshes with a fourth gear 11c, which meshes with the third gear 11b and the final reduction gear 31.

The inverter 13 provides DC power from the battery 12 to the electric motor 2 after converting the DC power to AC power and controls the drive force and the rotational direction of the electric motor 2 by adjusting the power supplied to the electric motor 2.

In addition to the motor driving described above, the electric motor 2 also functions as a generator, which is also used in regenerative braking as described below. During this regenerative braking, the inverter 13 causes the electric motor 2 to act as a generator by applying a generator load for regenerative braking to the electric motor 2, and the electric power generated by the electric motor 2 is stored in the battery 12.

In the hybrid vehicle of the first embodiment, only the power of the electric motor 2 reaches the drive wheels 5 via the power transmission mechanism 11 by driving the electric motor 2 in a state in which the clutch CL is released and the engine 1 is stopped in order to conduct traveling in an electric traveling mode (EV mode) with only the electric motor 2. During this time, the engine 1, which is in a stopped state, will not be dragged and rotated, and wasteful power consumption during EV traveling is suppressed by having the clutch CL released.

In the EV traveling state described above, if the clutch CL is engaged at the same time as the engine 1 is started with the starter motor 3, the power from the engine 1 will reach the drive wheels 5 sequentially via the torque converter T/C, the primary pulley 6, the V-belt 8, the secondary pulley 7, the clutch CL, and the final gear set 9, and the hybrid vehicle will travel in a hybrid traveling mode (HEV mode) via the engine 1 and the electric motor 2.

To stop a hybrid vehicle that is in the above-described traveling state or to maintain this stopped state, the objective is achieved by clamping and braking a brake disk 14 that rotates with the drive wheels 5 with a caliper 15. The caliper 15 is connected to a master cylinder 18 that outputs a brake fluid pressure corresponding to the brake pedal stepping force under boost by a negative pressure-type brake booster 17 in response to the stepping force on a brake pedal 16, which a driver steps on; braking of the brake disk 14 is carried out by operating the caliper 15 with this brake fluid pressure. In both the EV mode and the HEV mode, the wheels 5 are driven by a torque corresponding to a drive force command, which occurs when the driver steps on an accelerator pedal 19, and the hybrid vehicle is made to travel with a drive force corresponding to the needs of the driver.

The traveling mode selection of the hybrid vehicle, the output control of the engine 1, the rotational direction control of the electric motor 2, the shift control of the continuously variable transmission 4, the engagement and disengagement control of the clutch CL, and the charge/discharge control of the battery 12 are all carried out by a hybrid controller 21. At this time, the hybrid controller 21 carries out these controls via a corresponding engine controller 22, a motor controller 23, a transmission controller 24, and a battery controller 25.

Accordingly, a signal from a brake switch 26, which is a switch that is normally on and that switches from OFF to ON when braking by stepping on the brake pedal 16, and a signal from an accelerator opening sensor 27, which detects the accelerator pedal depression amount (the accelerator opening) APO, are input to the hybrid controller 21. The hybrid controller 21 further exchanges internal information among the engine controller 22, the motor controller 23, the transmission controller 24, and the battery controller 25.

The engine controller 22 controls the output of the engine 1 in response to a command from the hybrid controller 21, and the motor controller 23 controls the rotational direction and the output of the electric motor 2 via the inverter 13 in response to a command from the hybrid controller 21. The transmission controller 24 controls the shifting of the continuously variable transmission 4 (a V-belt-type continuously variable transmission CVT) and the engagement/disengagement of the clutch CL with oil from an engine-driven oil pump O/P as a medium in response to a command from the hybrid controller 21. The battery controller 25 controls the charging/discharging of the battery 12 in response to a command from the hybrid controller 21.

Figure 2:
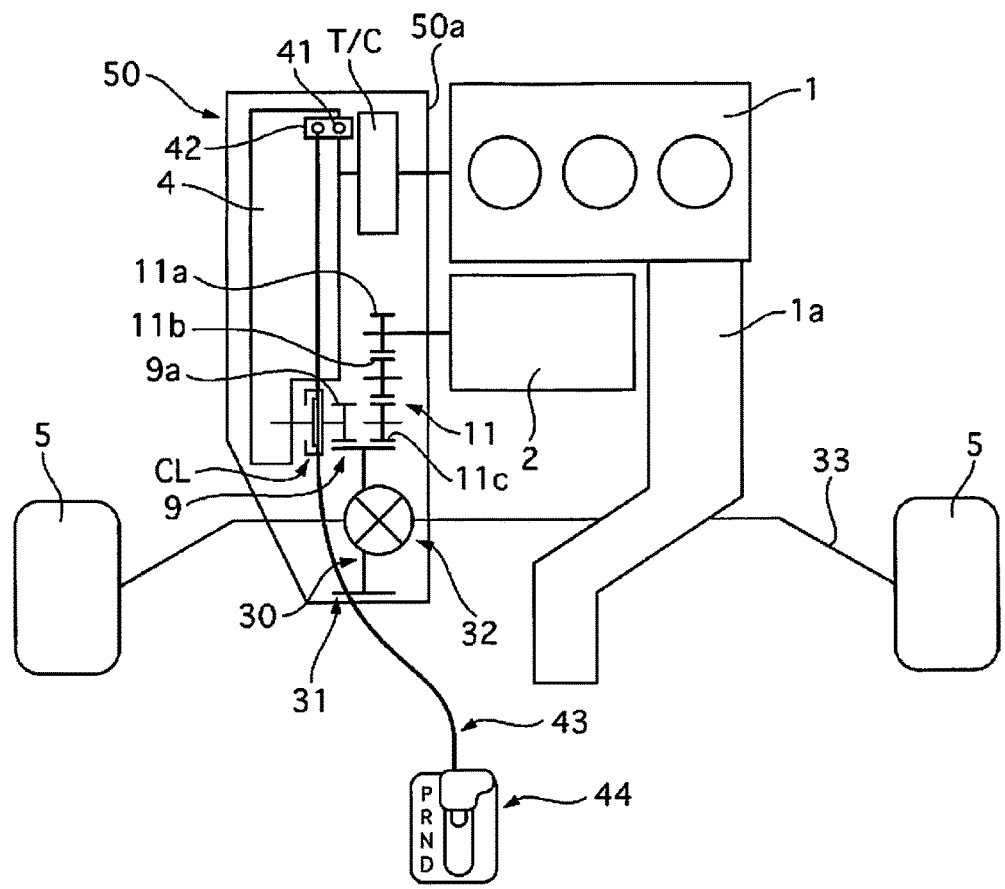
FIG. 2 is a schematic view showing the laid out configuration of the hybrid vehicle drive device of the first embodiment.

FIG. 2 is a schematic view showing the laid out configuration of the hybrid vehicle drive device of the first embodiment. The engine 1 and the electric motor 2 are disposed so that the crankshaft of the engine 1 and the rotating shaft of the electric motor are parallel, and both are mounted on a mounting surface 50a of a transaxle case 50. In other words, the engine 1 and the electric motor 2 are assembled so as to protrude from a substantially same plane of the mounting surface 50a. The torque converter T/C, the continuously variable transmission 4, the clutch CL, the first gear 9a, the final reduction gear device 30, and the power transmission mechanism 11 are housed in the transaxle case 50.

An engine exhaust pipe (or an intake pipe) 1a is provided to a portion on the opposite side of the mounting surface 50a side of the engine 1. A drive shaft 33 is coupled below the transaxle case 50. Thus, the electric motor 2 is disposed in a region sandwiched between the drive shaft 33 and the engine 1, as viewed from the radial direction, and is disposed in a region sandwiched between the mounting surface 50a and the engine exhaust pipe 1a, as viewed from the axial direction.

Figure 3:
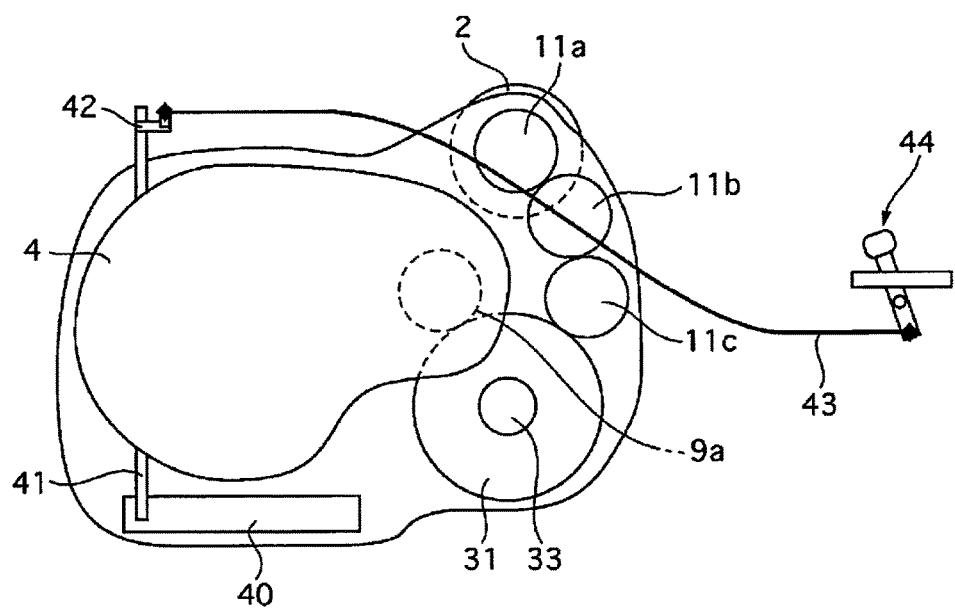
FIG. 3 is a schematic view of the hybrid vehicle drive device of the first embodiment in a vehicle-mounted state as viewed from the crankshaft side.

To facilitate the depiction in FIG. 2, the first gear 9a and the fourth gear 11c are shown as being side by side; however, in actuality, both the first gear 9a and the fourth gear 11c mesh with the final reduction gear 31 on the same plane in a direction perpendicular to the rotational axis of the final reduction gear 31, as shown in FIG. 3.

A control valve unit 40 that controls the hydraulic pressure necessary for shifting is provided to the continuously variable transmission 4 (refer to FIG. 3). A manual valve (not diagrammed) that operates in accordance with the position range of a shift lever 44, which is operated by the driver, is housed in the control valve unit 40. The manual valve interlocks with a manual shaft 41 that extends outside of the transaxle case 50. A selection lever 42 that extends in the radial direction, with the manual shaft 41 as the center, is mounted on the outside upper part of the transaxle case 50 of the manual shaft 41. One end of a shift cable 43 is attached to an end of the selection lever 42 on the opposite side of the manual shaft 41, and a shift lever 44, which is operated by the driver, is attached to the other end of the shift cable 43. A wire passes through the inside of the cylindrical outer tube of the shift cable 43; when the outer tube and the wire are moved relatively by the shift lever 44, the selection lever 42 revolves in response to the relative movement. Revolving the manual shaft 41 is thereby carried out, and the manual valve moves to a position corresponding to the shift lever 44. The routing of the shift cable 43 will be described below.

FIG. 3 is a schematic view of the hybrid vehicle drive device of the first embodiment in a vehicle-mounted state, as viewed from the crankshaft side. The power transmission mechanism 11 is formed by the second, third, and fourth gears 11a, 11b, 11c and is disposed so that the second gear 11a is distanced from the drive shaft 33. In other words, the inter-axial distance between the drive shaft 33 and the second gear 11a is disposed in a position to be greater than the inter-axial distance between the drive shaft 33 and the first gear 9a. The electric motor 2 is connected to the second gear 11a, and the inter-axial distance between the rotating shaft of the electric motor 2 and the drive shaft 33 is secured;

the power transmission mechanism 11 allows the size of the outer diameter of the electric motor 2 to be increased.

In the first embodiment, the power transmission mechanism 11 is configured to be a mechanism having a gear with two or more axes, so that the distance between the drive shaft 33 and the rotating shaft of the electric motor 2 can be increased efficiently. Since the power transmission mechanism 11 is a deceleration mechanism, amplifying the torque of the electric motor 2 is possible, which facilitates the ability to secure the drive force at starting time and to secure the drive force during acceleration that is necessary for a vehicle.

The electric motor 2 is disposed above the rotational axis of the drive shaft 33 with the transaxle case 50 in a vehicle-mounted state. In other words, as viewed from the top surface of the vehicle, the rotational axis of the drive shaft 33 is disposed in a position overlapping the projection plane of the electric motor 2 below the vehicle. That is, when securing the inter-axial distance of the drive shaft 33 and the rotating shaft of the electric motor 33 using the power transmission mechanism 11, reducing the overall size of the drive device, as viewed from the top surface of the vehicle, by disposing this device above the drive shaft 2 becomes possible, and providing an overall compact drive device, even if the size of the electric motor 2 is increased, is possible.

Figure 4:
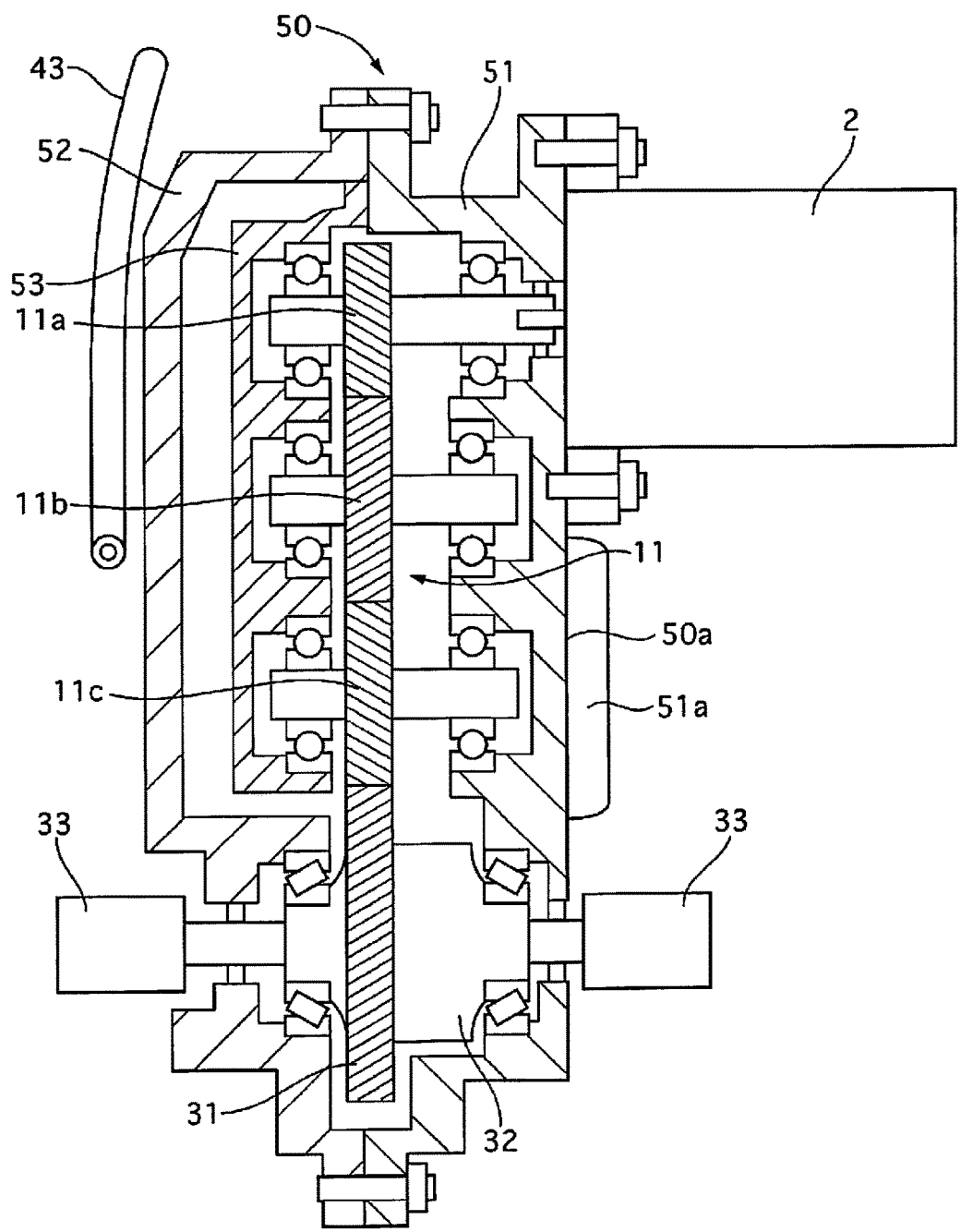
FIG. 4 is a partially enlarged cross-sectional view of the portion accommodating the power transmission mechanism in the hybrid vehicle drive device of the first embodiment.

FIG. 4 is a partially enlarged cross-sectional view of the portion accommodating the power transmission mechanism in the hybrid vehicle drive device of the first embodiment. The transaxle case 50 is formed by a converter housing 51 that houses the torque converter T/C, a transmission case 51 that houses the continuously variable transmission 52, and a middle wall 53 that separates the converter housing 4 from the transmission case 52. These configurations are installed by, first, fixing the middle wall 53 to the converter housing 51 with a bolt, then fixing the converter housing 51 to the transmission case 52, to which the middle wall 53 is attached.

The second, third, and fourth gears 11a, 11b, 11c, which form the power transmission mechanism 11, are accommodated between the converter housing 51 and the middle wall 53. As a result, mounting the electric motor 2 without providing a deceleration mechanism, etc., on the mounting surface 50a side becomes possible, and the axial direction dimensions of the electric motor 2 can be increased in size by securing a space between the engine exhaust pipe 1a and the mounting surface 50a.

In this manner, ease of assembly is ensured by dividing and configuring the transaxle case 50 from the converter housing 51, which is on the engine side, and the transmission case 52, which is on the transmission side. In other words, when considering the ease of assembly, disposing the power transmission mechanism 11 in a part that can be divided into the converter housing 51 and the transmission case 52 is advantageous.

The converter housing 51 comprises a rib 51a on the mounting surface side 50a. The generation of radiated noise can thereby be suppressed by holding the power transmission mechanism 11 with the converter housing 51, even if vibration accompanying an increase in the rotational speed occurs, since the converter housing 51 is reinforced.

The routing of the shift cable 43

Next, the routing of the shift cable 43 will be described. As illustrated in FIG. 2, the hybrid vehicle drive device of the embodiment is a front-engine, front-wheel drive system that has a transverse engine 1, and the transaxle case 50 is connected to the output side of the engine 1; as a result, the manual shaft 41 and the selection lever 42 are in positions that are slightly offset to one side (the left side in FIG. 2) from the center of the vehicle width direction. On the other hand, since the shift lever 44 is set to be substantially near the center of the vehicle width direction, the shift cable 43, which connects the shift lever 44 and the selection lever 42, is routed in a slightly curved manner, as illustrated in FIG. 2. At this time, since a wire moves relatively inside of the outer tube of the shift cable 43, as described above, if the shift cable 43 is substantially curved, the friction will increase, or smooth operation will be interrupted; therefore, the connection should be made with as little curvature as possible.

As illustrated in FIG. 3, the power transmission mechanism 11 is provided in a region of the transaxle case 50 that expands radially outward in consideration of assembling property, etc. Thus, the shift cable 43 is connected to the selection lever 42 through the vicinity of the transmission case 52, which is the side wall of the portion to which the power transmission mechanism 11 is provided (refer to FIG. 4). At this time, if each rotary element of the power transmission mechanism 11 were to be held between the transmission case 52 and the converter housing 51 without using a middle wall 53, especially the second gear 11a, which is connected to the electric motor 2, a high-speed rotation tends to occur, and radiated noise is likely generated; as a result, there is the risk that vibration performance cannot be secured.

In relation to this problem, securing the thickness or providing a rib is conceivable in order to secure the strength of the transmission case 52. However, curving the shift cable 43 as little as possible is desirable; as a result, if the transmission case 52 is reinforced, etc., the transmission case 52 will expand in the rotational axis direction, and the curvature the shift cable 43 will be increased, making an appropriate routing difficult.

Therefore, in the embodiment, a middle wall 53 that is attached to the converter housing 51, rather than to the transmission case 52, is provided; by housing the power transmission mechanism 11 with this converter housing 51 and the middle wall 53, the curvature of the shift cable 43 is suppressed, and the vibration performance is secured.

As described above, the effects listed below can be obtained with the first embodiment.

(1) The present invention comprises: a continuously variable transmission 4 (a transmission) that is coupled to an engine output shaft of an engine 1;

a final reduction gear 31 that is coupled to a transmission output shaft of the continuously variable transmission 4;

a drive shaft 33 that is coupled to the final reduction gear 31;

a power transmission mechanism 11 that transmits the rotation of the electric motor 2 (an electric motor) to the final reduction gear 31; and a transaxle case 50 that houses the continuously variable transmission 4, the final reduction gear 31, and the power transmission mechanism 11 and that has a mounting surface 50a for mounting the engine 1 and the electric motor 2a;

wherein the transaxle case 50 is configured by an engine-side converter housing 51, a continuously variable transmission-side transmission case 52, and a middle wall 53 that is attached to the converter housing 51 and that separates the converter housing from the transmission case 52, and the power transmission mechanism 11 is housed between the converter housing 51 and the middle wall 53.

In other words, with the power transmission mechanism 11 being housed between the converter housing 51 and the middle wall 53, the power transmission mechanism 11 will not be supported by the transmission case 52, and avoiding a deterioration in the vibration performance caused by the power transmission mechanism 11 becomes possible.

(2) The transaxle case 50 comprises a rib 51a on the mounting surface 50a. The generation of radiated noise can thereby be suppressed by holding the power transmission mechanism 11 with the converter housing 51, even if a vibration accompanying an increase in the rotational speed occurs, since the converter housing 51 is reinforced.

The present invention was described above based on each embodiment; however, the invention is not limited to the configurations described above, and other configurations are included in the present invention.

For example, an example was described in the embodiment, in which gears were combined as the power transmission mechanism 11; however, the power transmission mechanism is not limited to gears and can be configured from a chain and a sprocket. Also, an example was described in the embodiment in which the first gear 9a and the final reduction gear 31 are meshed, and the power transmission mechanism 11 and the final reduction gear 31 are meshed; however, the power transmission mechanism 11 and the first gear 9a may also be meshed.

Additionally, an example was described in the embodiment, in which an electric motor 2 of a hybrid vehicle is mounted; however, the present invention can also be applied when mounting a large generator that supplies a drive current to a motor provided to another wheel. Also, an example of an electric motor was described, but the present invention can be applied when providing a transfer as a four-wheel drive unit.

In the hybrid vehicle of the first embodiment, an example was described in which a continuously variable transmission 4 is mounted; however, the present invention is not limited to a continuously variable transmission 4 and may be another, stepped transmission. A planetary gear mechanism comprising a plurality of frictional engagement elements can be mounted in place of the clutch CL, and a sub-transmission that is able to appropriately shift gears can be also mounted.

Furthermore, a configuration was described in the embodiment, in which the engine is restarted by a starter motor 3, but other configurations are also possible. Specifically, in recent years, a technology has been put into practical use, in which the alternator is replaced with a motor generator in a vehicle with an idling stop function, and an alternator function is added to this motor generator to add an engine starting function; as a result, restarting the engine is carried out from an idling stop by this motor generator, rather than the starter motor. The present invention may be configured so that restarting the engine is carried out by a motor generator described above.

The invention claimed is:

1. A hybrid vehicle drive device, comprising:
a transmission coupled to an engine output shaft of an engine;
a final reduction gear coupled to a transmission output shaft of the transmission;
a drive shaft coupled to the final reduction gear;
a power transmission mechanism configured to transmit rotation of an electric motor to the final reduction gear; and
a transaxle case accommodating the transmission, the final reduction gear and the power transmission mechanism, the transaxle case further having a mounting surface configured to have the engine and the electric motor mounted thereto;
the transaxle case being formed by an engine-side converter housing, a transmission-side transmission case, and a middle wall that is attached to the converter housing and separates the converter housing from the transmission case, and
the power transmission mechanism being housed between the engine-side converter housing and the transmission-side transmission case.

2. The hybrid vehicle drive device recited in claim 1, wherein
the transaxle case comprises a rib on the mounting surface.

3. A hybrid vehicle drive device, comprising:
a transmission coupled to an engine output shaft of an engine;
a final reduction gear coupled to a transmission output shaft of the transmission;
a drive shaft coupled to the final reduction gear;
an electric motor;
a power transmission mechanism configured to transmit rotation of an electric motor to the final reduction gear; and
a transaxle case accommodating the transmission, the final reduction gear and the power transmission mechanism, the transaxle case further having a mounting surface configured to have the engine and the electric motor mounted thereto;
the transaxle case being formed by an engine-side converter housing, a transmission-side transmission case, and a middle wall that is attached to the converter housing and separates the converter housing from the transmission case, and
the power transmission mechanism being housed between the engine-side converter housing and the transmission-side transmission case, the power transmission mechanism including a gear having a first end rotatably supported on the converter housing and a second end rotatably supported on the middle wall, the gear being configured to be attached to an output shaft of the electric motor.

* * * * *